(12) United States Patent
Mimar

(10) Patent No.: US 7,548,586 B1
(45) Date of Patent: Jun. 16, 2009

(54) AUDIO AND VIDEO PROCESSING APPARATUS

(76) Inventor: Tibet Mimar, 1040 Gloucester Ct., Sunnyvale, CA (US) 94087

( * ) Notice: Subject to any disclaimer, the term of this patent is extended or adjusted under 35 U.S.C. 154(b) by 532 days.

(21) Appl. No.: 10/357,644

(22) Filed: Feb. 3, 2003

Related U.S. Application Data

(60) Provisional application No. 60/364,315, filed on Mar. 14, 2002, provisional application No. 60/354,335, filed on Feb. 4, 2002.

(51) Int. Cl.
*H04N 7/12* (2006.01)
*G05B 19/18* (2006.01)
(52) U.S. Cl. .................................. 375/240.26; 700/19
(58) Field of Classification Search ................ 348/409, 348/420, 616, 384, 390, 401, 403, 411, 412, 348/413, 415, 416, 405, 402; 382/275, 251, 382/254; 375/240.27, 240.29, 240.12, 240.1, 375/240, 240.24; 700/19, 10, 20, 17, 83
See application file for complete search history.

(56) References Cited

U.S. PATENT DOCUMENTS

| | | | |
|---|---|---|---|
| 5,621,467 A * | 4/1997 | Chien et al. .................. 348/409 |
| 5,815,164 A | 9/1998 | Howell | |
| 5,968,167 A | 10/1999 | Whittaker | |
| 6,275,239 B1 * | 8/2001 | Ezer et al. .................... 345/473 |
| 6,466,624 B1 * | 10/2002 | Fogg ..................... 375/240.27 |
| 2001/0008563 A1 | 7/2001 | Yamaura | |
| 2001/0021941 A1 | 9/2001 | Arakawa et al. | |
| 2006/0200253 A1 * | 9/2006 | Hoffberg et al. .............. 700/19 |

OTHER PUBLICATIONS

U.S. Appl. No. 09/888,294, filed Jun. 22, 2001, Mimaroglu.
Brian Dipert, "Video Improvements Obviate Big Bit Streams", EDN, Mar. 15, 2001, pp. 83-102.
Xillieon 220 Chip from ATI, Inc. www.ati.com System-on-a-chip for Digital TV, set-top boxes, gateways.
Equator Inc's MAP-CA VLIW Processor www.equator.com.
Texas Instrument Inc.'s TMS3206415 DSP www.ti.com.

* cited by examiner

*Primary Examiner*—Behrooz Senfi
(74) *Attorney, Agent, or Firm*—Sawyer Law Group, P.C.

(57) ABSTRACT

A media processor for performing audio, video, and system layer tasks on a fully programmable single-chip integrated processor chip. The present invention performs video compression/decompression, audio compression/decompression, video input and output scaling, video input and output processing for enhancement, and system layer functions. The media processor is a single IC semiconductor chip that is coupled to one or more memory chips, audio front-end chip, and optional I/O interface chips. The media processor is compromised of the following integrated on a single IC semiconductor: Video processor with a SIMD vector engine, audio processor, stream processor, system (host) processor, and video scalers, LUTs and hardware blender.

28 Claims, 13 Drawing Sheets

DESCRIPTOR-BASED DMAs

CIRCULAR QUEUE BASED DMAs

AUDIO AND VIDEO PROCESSING APPARATUS

CROSS-REFERENCES TO RELATED APPLICATIONS

This application claims priority under 35 U.S.C 119(e) from co-pending U.S. Provisional Application No. 60/354,335 filed on Feb. 4, 2002 by Tibet Mimar entitled "Audio and Video Processing Apparatus", and from co-pending U.S. Provisional Application No. 60/364,315 filed on Mar. 14, 2002 by Tibet Mimar entitled "Vision Processor", the subject matter of which is fully incorporated herein by reference.

BACKGROUND OF THE INVENTION

1. Field of the Invention

The present invention relates to an integrated media processor chip, which performs video, audio, system, and network connectivity functions.

2. Description of the Background Art

Existing media processing devices take many different shapes, sizes, and costs. These computing devices range from single-fixed function chips to programmable processor chips. These devices are used in set-top boxes, DVD players, digital cameras/camcorders, as well as the emerging digital TV market, and their prices have been mostly constant over time. Majority of these chips have a programmable processor plus many dedicated fixed-function blocks. The processor does not have enough processing power to be in the video data path, and it is used as a supervisory control of data between fixed-function blocks. Some of these chips may feature multiple on-chip processors for handling, audio, system, and stream decode functions.

Designers of future digital TVs and set-top boxes have to incorporate the following functionality:
 A. MPEG-2 decode, which requires video decompression, audio decompression, and audio/video stream de-multiplexing and related stream layers functions.
 B. Video enhancement because, for current and upcoming large screen projection, LCD and Plasma displays, it is important to process images to reduce artifacts due to interlacing, compression, etc.
 C. Support other new standards of MPEG-4 and H.264, as well as proprietary standards from Real Networks and Microsoft for DVD and video compression.
 D. On-screen displays (OSD) and user control via remote control. OSDs are used for user menus and also for web browser and teletext functionality commonly used in Europe.
 E. Personal Video Recorder (PVR) functionality to store and pause live audio/video.
 F. Network connectivity and home gateway functionality in interfacing to LAN and broadband network interface chips.

Currently, each of the above functionality requires a separate chip plus memory chips to implement. This increases the cost and number of chips significantly. Current TV manufacturers would like to have one flexible platform that would meet the requirements for different products and geographic markets.

Some of building blocks such as MPEG-2 decoder chip do not support the latest compression standards and algorithms. This represents a problem because audio/video standards are evolving at a fast pace. MPEG-2 came out in 1995, and MPEG-4 part 2 came out in 1999, and now MPEG-4 part 10 was out in 2002. MPEG-4 part 10 offers 2-3 times improvement over MPEG-2, but requires variable block sizes and significantly more processing power. H.264 as part of MPEG-4 part 10 will allow storing a video at 1 or 1.5 Mbps using a CD-RW drive. The fixed function processors such as the one from ATI (Xillieon 220 chip from ATI, inc. is system-on-a-chip for digital TV, set-top boxes, and media gateways) and other manufacturers do not have to flexibility to meet requirements of a video decompression, compression, enhancement, and system layer tasks as required by market of multiple standards plus proprietary ones. In other words, a fully programmable video processor is required to support both the new and legacy standards.

There are some VLIW chips such as the one from Texas Instruments (TMS3206415 DSP) and Equator (MAP-CA VLIW Processor) that provide a fully programmable platform for audio/video processing. Another is the media processor proposed by Ezer, et al [See referenced patent]. These processors implement all tasks in a single SIMD or VLIW processor. These have significant problems. First, these processors do not provide the processing power to handle all video and audio functions. As a result, significant compromises have been made in software implementation, which lowers the resultant quality of video and audio. Second, combining these characteristically different tasks on a single processor core reduces the efficiency significantly. For example, while performing the streaming operation, which is intrinsically not parallelizable, most of the elements of VLIW or SIMD stay idle and not used.

The task switching between these multiple audio, video, and system tasks require several hundred-clock cycles, which further reduce the efficiency. Furthermore, the developers' task of integrating audio, video, stream, and system functions into a single core unit's multiple tasking becomes formidable. Some of the existing processors such as Texas Instruments' MVP DSP used multiple cores with shared memory on a single chip. However, the shared memory contentions and the difficulty of programming made such an approach failure, and as a result this processor has been discontinued.

These devices also lack the direct interfaces to connect to external devices as required. They do not have FIFOs and they do not have ports for direct connection to IDE, video input/output, IEEE-1394, transport stream input, etc.

These devices also lack the high-quality video output scaler for converting internal resolution to match to resolution of the display device. High quality video scaling, by itself, exceeds the processing capabilities of some of these processors.

Manufacturers of next generation TVs are unable to differentiate their picture quality from one another because today, all merchant video processing ICs for video enhancement are fixed function. Therefore, tier 1 manufacturers like Sony build their own video enhancement chips that are fixed function. Tier 2 manufacturers have to use off-the-shelf video enhancement chip with no differentiation for their products.

In summary, existing processors and other dedicated chips lack the three key ingredients sought by TV and set-top box manufacturers in descending priority: Low cost, high video quality, and flexibility.

Digital Camcorder

Convergence of Digital Cameras and Digital Camcorder functionality has begun. Digital cameras can capture of 10-15 seconds long video sequences using MPEG, in addition to JPEG recording of still pictures. Digital camcorders use DV format to store compressed video and audio at 25 M-bits per second, but also support still frame capture. A powerful and low-cost media processor would enable further convergence using the latest audio/video compression algorithms that reduce audio/video to about 1 Mbits per second, whereby enabling its storage in small semiconductor storage devices such as memory cards, or its transmission over internet networks using wireless or LAN. The new cameras would then no longer need complicated mechanical drive and record mechanisms. The compressed audio and video data stream would simply be stored on a DAT drive or a Flash Memory card. Such storage will lower the cost and physical size while fully combining the functionality of digital cameras and digital camcorders. The following lists the advantages that would be provided by such a processor:

- Combined digital camera and camcorder functionality in a small package;
- Flash card could be used to store video and audio using H.264 compression (MPEG-4 Part).
- Major cost reduction since tape drive mechanism and expensive record head no longer required, combined with reliability of solid state mechanism.
- Supports MPEG-4 encode and decode (and mp4 file format);
- Supports the new JPEG-2000 standard to capture still frame shots, which produces 2× better picture quality in comparison to the legacy JPEG;
- Also supports other media compression standards that could be directly transferred to PC and played back: Windows Media Player 8.0, RealNetworks
- Sophisticated motion stabilization in video camera mode—media processor would also be capable of video rate stabilization to sub pixel resolution and can compensate for image motions as large as 64 pixels;
- Longer battery life and smaller battery required due to no complicated tape drive mechanism needed, and power management functions of processor.
- Supports image mosaicking of multiple panned frames into a single panoramic picture.

SUMMARY OF THE INVENTION

The present invention integrates four programmable processors on a single semiconductor chip, where each processor is a standard RISC type and uses the unified external memory. Data transfers between multiple processors use multiple packet-based unidirectional communication channels via hardware-assisted circular queues in unified memory. These buffers provide an efficient and configurable way of data communication between multiple processors without any data contentions and stall conditions. The video processor is 32- or 64-wide SIMD processor coupled to a regular RISC processor as a dual-issue processor, where during each clock cycle one RISC and one SIMD instruction is executed. Video processor uses a dual-port data buffer and descriptor-based DMA transfers concurrent with processing, instead of the traditional cache structure.

Audio processor handles all audio level functions such as audio compression, decompression, and acoustical echo cancellation. Stream processor (also referred to as bit-stream processor herein) handles multiplexing and de-multiplexing of multiple audio and video streams as well as variable length coding for video streams, processing of and also encryption and error correction. System processor handles On-Screen Displays (OSDs), network connectivity and other host functions such as handling user I/O and system functions, for example controlling IDE interface.

Two hardware video scalers with programmable parameters are used to off-load the processors from video scaling tasks; with the exception that video DMA is capable of subsampling video by factors of {1, 2, 4, 8} during the DMA transfer.

All input and output video data is passed via the unified memory. Video output is blended with OSD using a dedicated blender. All of the interfaces required for digital TV and set-top box are included on chip, specifically IDE interface, 10/100 Ethernet for LAN, plasma/LCD interface, USB/IEEE-1394 interface to physical interface device for video input/output, interfaces video front and back-end chips, IIS and IIC for audio and control, DUART/infrared input serial interface. All of these interfaces have on-chip FIFOs for buffering and for clock independence.

BRIEF DESCRIPTION OF THE DRAWINGS

The accompanying drawings, which are incorporated and form a part of this specification, illustrated prior art and embodiments of the invention, and together with the description, serve to explain the principles of the invention.

DETAILED DESCRIPTION

The present invention uses four processors on a single semiconductor chip, each to implement separate functionality, as shown in Table 1. The advantage of using separate processors is that there is no need for time-consuming overhead of task switching, and therefore the efficiency is higher. Also, the implementation is much simpler. Each processor is a C programmable RISC type processor that is well proven with stable development tools. Each processor's clock speed is independently controlled to match the processing capabilities needed, dynamically or statically, and for power consumption reduction the clock rate is reduced under software control.

The unified memory, external or internal to the semiconductor chip, stores all processors' instruction memory, and all data that is buffered between processors and for input/output ports. Unified memory is typically a SDRAM, which is connected to the on-chip memory controller. Upon startup, the Flash memory containing program instructions for all processors is loaded into unified memory, and then each processor loads its program cache from the portion of unified memory containing its instructions. Other than the convenience of loading of program memories to all four processors at start-up time, audio, stream and video processors do not really need a program cache, but a small fixed size memory such as 32 or 64 K bytes is adequate.

Figure 1:
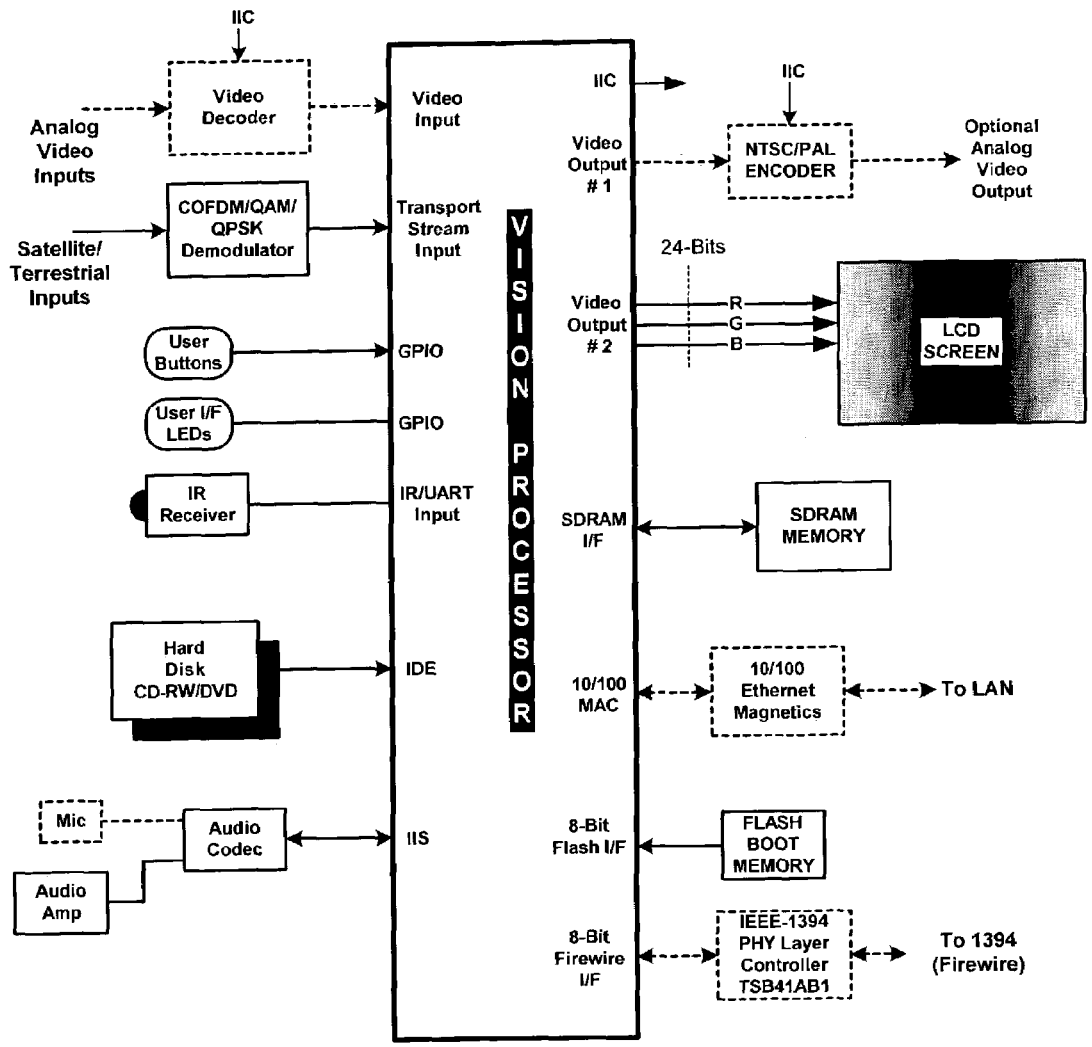
FIG. 1 shows the implementation of Digital TV using present invention.

FIG. 1 shows the block diagram of Digital TV implementation using the present invention. The only major semiconductor components required beside the media processor, referred to as Vision Processor in this figure, is external Flash and SDRAM unified memory, audio front-end chips, and demodulator IC. The present invention directly drives LCD, Plasma and other flat panel displays that have a standard or very similar interface. The screen resolution and frame rate are programmable parameters. There is a direct local area network (LAN) connection, IEEE-1394 interface on the chip, as well as the IDE interface to directly connect to hard disks for storage of video and other information. Personal Video Recorder (PVR) that is becoming very popular for short video pauses of live TV and time-shifting instead of VHS type older video recorders are stored on hard disk using this interface. IIS interface is used to interface to audio front-end chips and also IIC interface is used to control any optional video front- or back-end chips. The transport stream from demodulator chip brings in compressed audio/video stream, which is usually MPEG-2 compliant. The functions of demodulator chip could also be implemented within the video processor of present invention, however, this requires also adding analog-to-digital converters. Demodulator is otherwise a digital function that does not require a lot of signal processing. Actually, there are multiple standards for digital video modulation, and therefore, unifying these multiple possible front-end into a single and integrated chip will enhance the present inventions appeal to TV OEM manufacturers.

Figure 2:
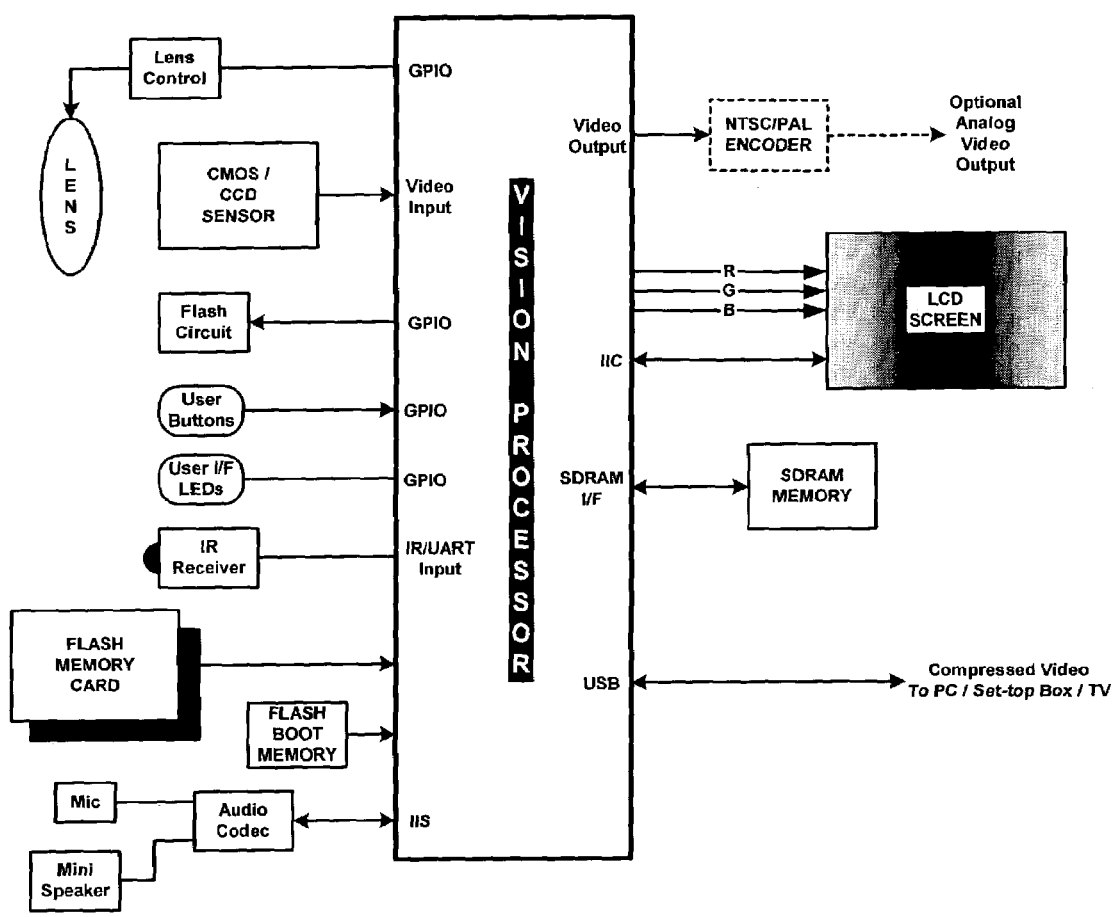
FIG. 2 shows the implementation of Digital Camcorder using present

FIG. 2 shows the block diagram of a Digital Camcorder and Digital Camera combination. The input/outputs of this application is very similar to the Digital TV, except the CCD sensor input is used. In this case, the present invention is used to compress video and audio data in one of multiple possible formats, provide camera stabilization again motion, and video pre-filtering of data. In this figure, USB instead of IEEE-1394 (Firewire) interface is shown to transfer pictures and video sequences.

Figure 3:
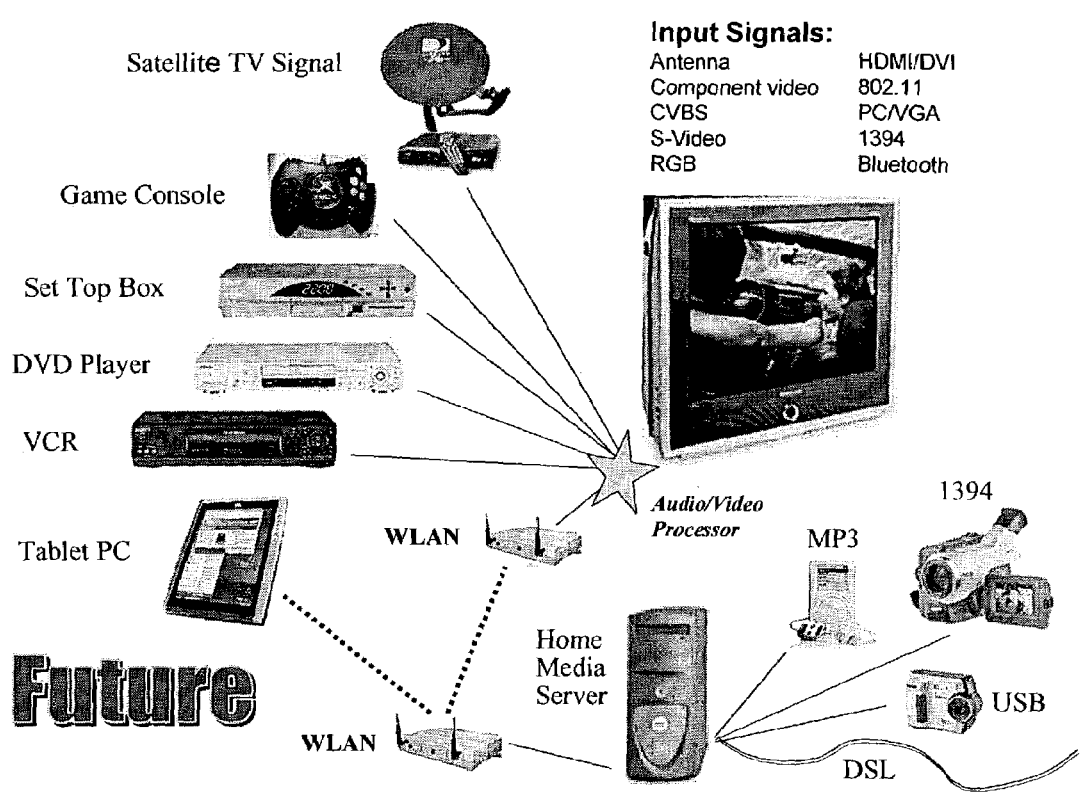
FIG. 3 shows the future market of Networked TV using Digital TV as the center of home entertainment.

FIG. 3 illustrates the convergence of home entertainment around Digital TV. Set-top box functionality will disappear and will be absorbed by TV, including optional PVR. Future TV will be network connected to home gateway and home PC, which could function as media server. Wireless or LAN communication could be used to connect TV to other devices. In the case of Wireless LAN (WLAN), LAN to WLAN adapter is used internally or externally.

Figure 4:
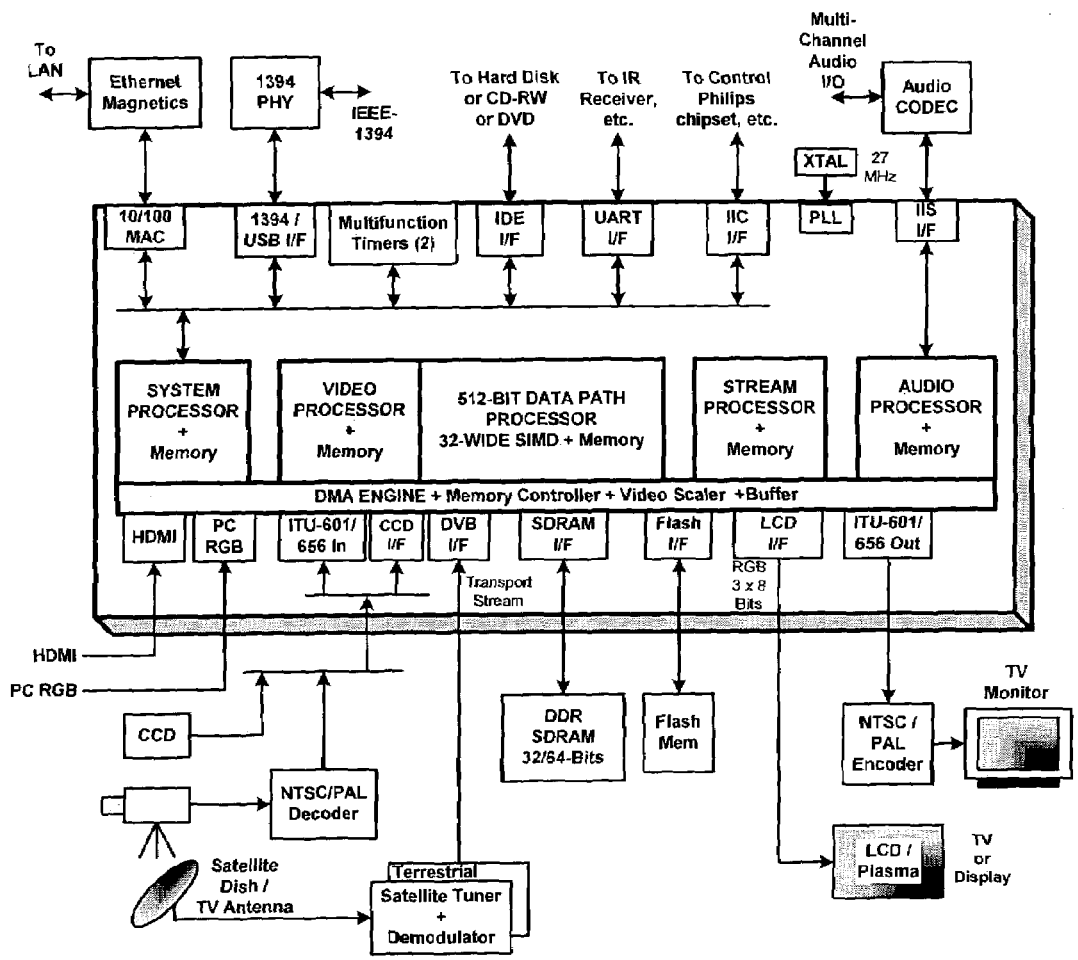
FIG. 4 shows the high-level block diagram of present invention and its connections to outside world.

FIG. 4 shows the top-level diagram of present invention and its connections to outside world. All processors communicate via a unified DMA engine and memory controller. AES decryption assist hardware or similar is required to decode digital copyright management. HDMI and PC RGB are other possible digital video inputs. Flash memory is used for loading software into the four processors. It is also programmable to provide field upgradability. Crystal input (shown as XTAL) and on-chip Phase-Locked Loop (PLL) provide video clock.

Figure 5:
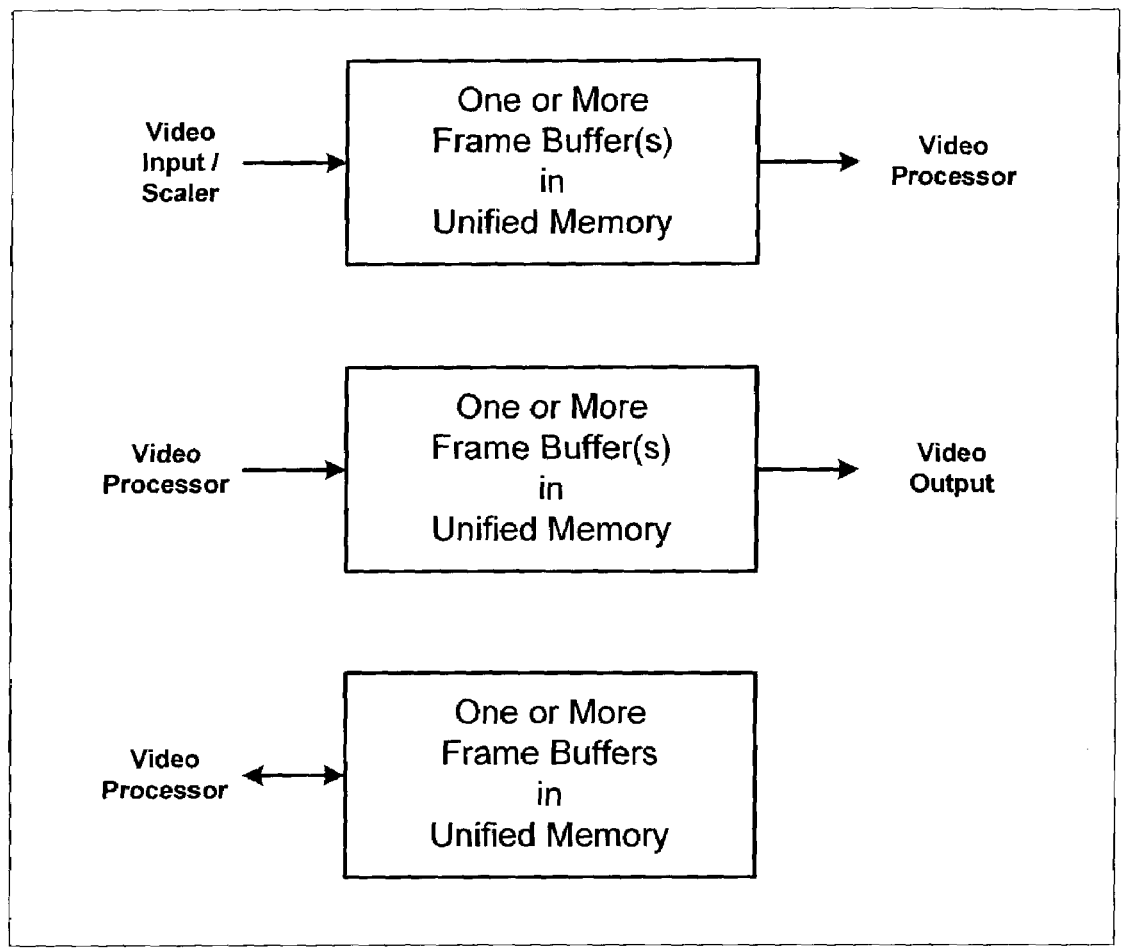
FIG. 5 shows the concept diagram of how descriptor-based DMA and circular queues are used for transferring video between Unified Memory and local on-chip memory and for inter-processor data and control communication.
Figure 5:
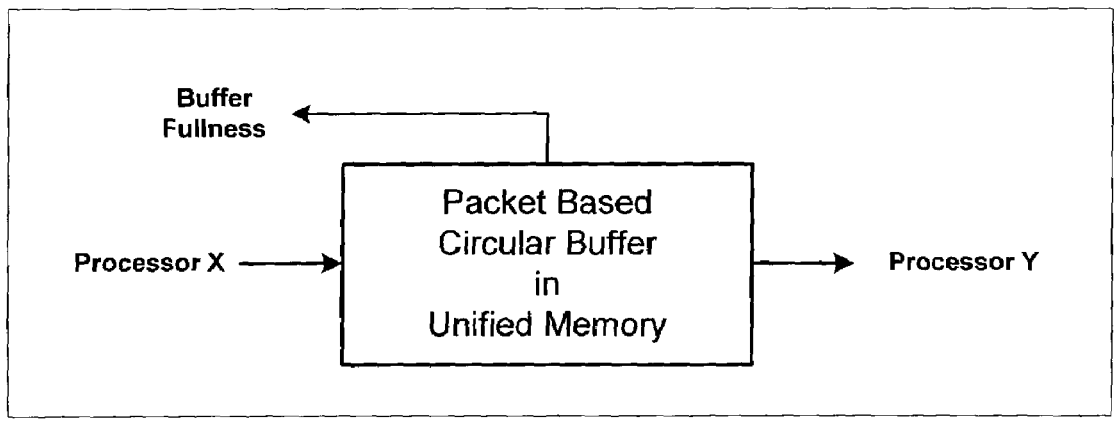

FIG. 5 shows the concept diagram of data flow on the present invention. The unified memory provides the data connection between all processors and other input/output blocks. The data connection between processors is multiple unidirectional channels. Therefore, no access contention to shared memory locations occurs during data flow between processors. The flow rate is controlled by the slowest link in the data chain. Associating the input channel of a given processor with one of the data buffers, which is used as destination by an I/O block or another processor, forms data connection between processors. The software running on processors selects this association statically. Each data channel has parameters of start address, maximum buffer size, input processor, output processor, and channel priority.

Input and output video channels are transferred to or from video processor via the unified memory. At any given time, unified memory holds multiple video frames and also the OSD frame memory. Portions of one or more video frames are transferred to local memory of video processor for processing, and then it is transferred back. All video and OSD transfers are handled using multiple channels of descriptor-based DMAs.

Figure 6:
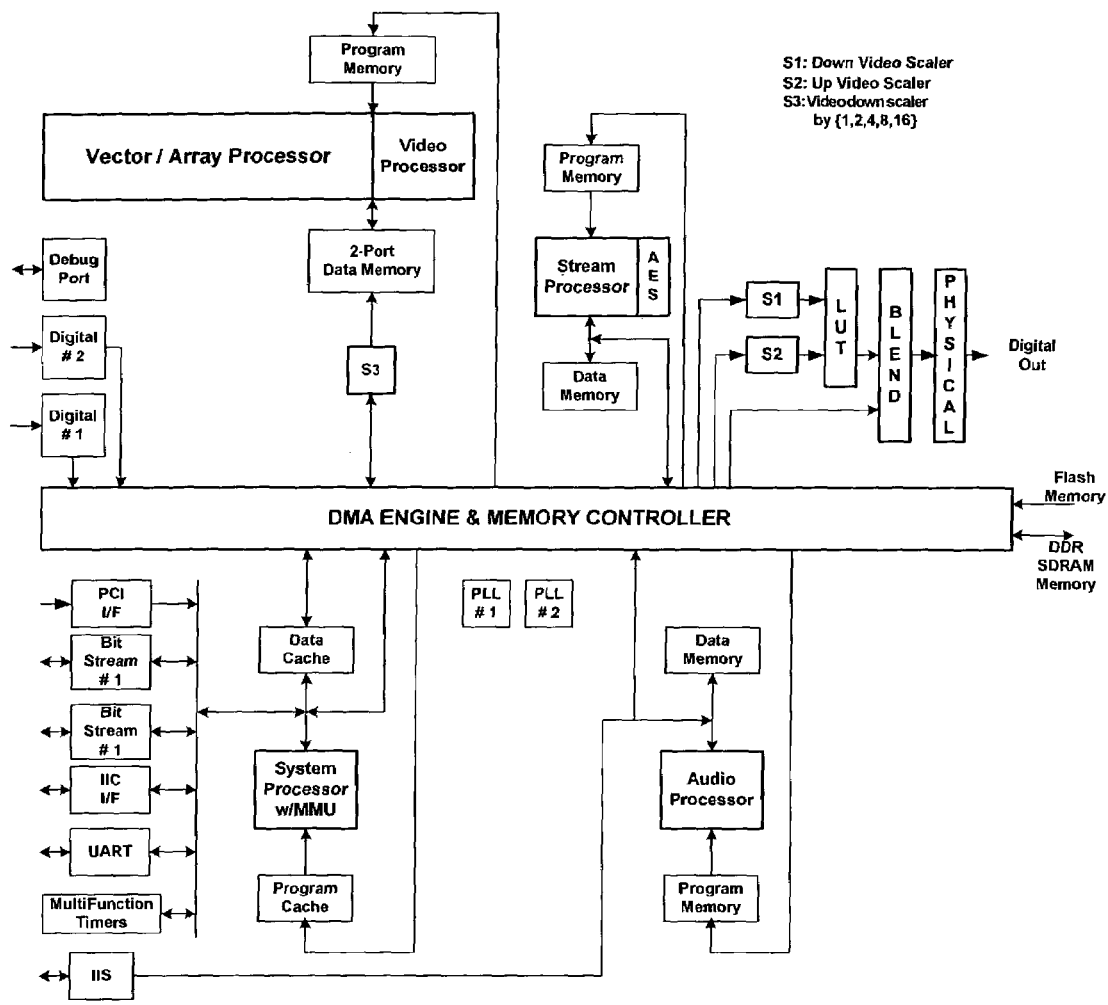
FIG. 6 shows the detailed block diagram of audio/video media processor.

A more detailed block diagram of present invention is shown in FIG. 6. The memory controller services many channels of data and program cache transfers. In addition, the memory controller also services program and data caches of all processors. Higher priority channels are services first, and all channels within a given priority are services in round-robin fashion. Audio, stream and video processors use fixed program and data memories, i.e., no program or data caches are used. System processor has to run a Windows CE or Linux type operating system, and therefore both data and program caches and memory management unit are required.

Two video scalers are used at the output (shown as S1 and S2), followed by Look-Up Tables (LUT), blend logic to overlay OSD over video display. The physical interface handles hardware interface of control and data signals for digital display unit. The reason for two scalers is that primary video and Picture-In-Picture (PIP) has to be scaled separately. S3 video scalar that is in the path between the video processor and UM is used to sub-sample video data in both horizontal and vertical directions during transfers from UM to local video processor data memory for the purpose of processing operations on multiple video resolution levels, which are typically required by motion-estimation and other similar algorithms.

Video Processor

Figure 7:
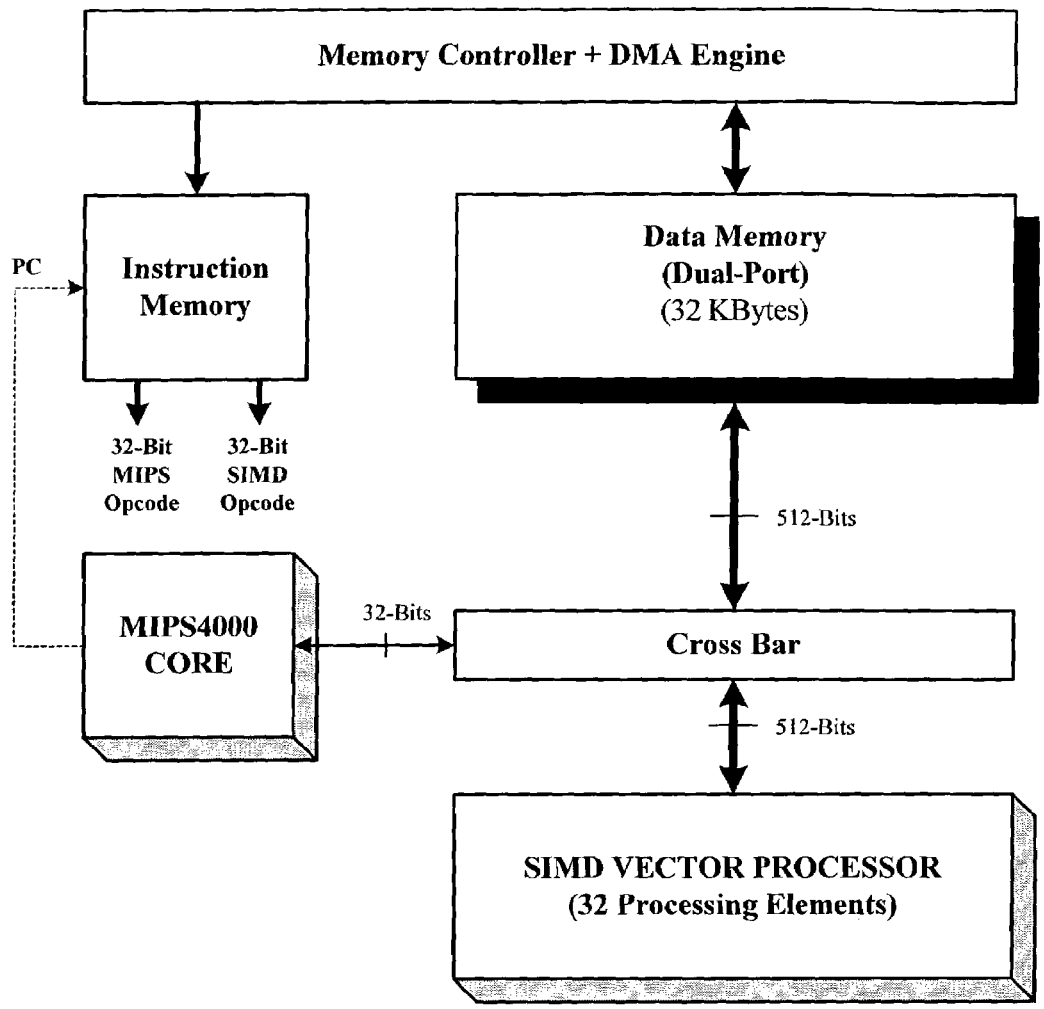
FIG. 7 shows the details of scalar and SIMD processor portions of video processor and how they are interconnected.

Video processor is a dual-issue processor that executes one RISC and one SIMD instruction, as shown in FIG. 7 with a preferred embodiment using 32 elements for SIMD. Using 16-bits per SIMD element and 32 elements require data memory that is 512 bits wide. The opcode is 64-bits wide, containing a 32-bit RISC and 32-bit SIMD opcode. RISC processor acts as the scalar processor and performs program flow control and also vector load and store instructions to/from the vector register file. SIMD processor does not have any flow control and simply operates on selected vector registers and its output is written to a vector register.

One port of dual-port local data memory connects to the memory controller for DMA transfers to/from accesses one port unified memory, and the second port is used by scalar RISC processor for loading and storing vector registers, or as scalar processor data memory.

A large video frame is divided into overlapping block areas that are sequentially brought in for processing. The output blocks typically do not overlap. The input blocks overlap in horizontal and vertical direction by the amount that is necessary to access neighborhood. Typically, multiple video processing operations within a data memory is pipelined in software, and at each stage the output data is either written in-place or to another area of the data memory. Each process in the pipeline passes the address of the output data to the next process, which uses it as its input data. DMA transfer of next two-dimensional block and pipeline processing of current block is concurrent. Crossbar is used to select a portion of wide memory for access by the RISC processor, or to order SIMD elements during misaligned transfers between data memory and vectors registers.

TABLE 1

Processor Features and Functions Implemented

| PROCESSOR | FEATURES | Functions Implemented |
|---|---|---|
| System Processor | RISC<br>Memory Management Unit (MMU)<br>Data Cache<br>Program Cache | User Interface<br>On-Screen Display Messages<br>Web Browser<br>Network Connectivity (TCP/IP)<br>IDE Disk Control |
| Stream Processor | RISC<br>Optional Program Cache<br>Bit-Stream Instructions<br>Optional DES Coprocessor<br>DVB Descrambler | Multi-channel Muxing and demuxing of audio, video and other data channels<br>Arithmetic or Huffman coding and decoding<br>Encryption/Decryption<br>DVB descrambling<br>Stream layer frame handling |
| Audio Processor | RISC<br>Optional Program Cache<br>Accumulator | Multi-channel audio compression/decompression<br>Acoustical Echo Cancellation |
| Video Processor | RISC<br>SIMD Processor<br>Vector Load/Store instructions<br>Optional Program Cache<br>DMA to/from unified memory | Video compression/decompression<br>Video Enhancement |

Multi-Processor Communication

Figure 13:
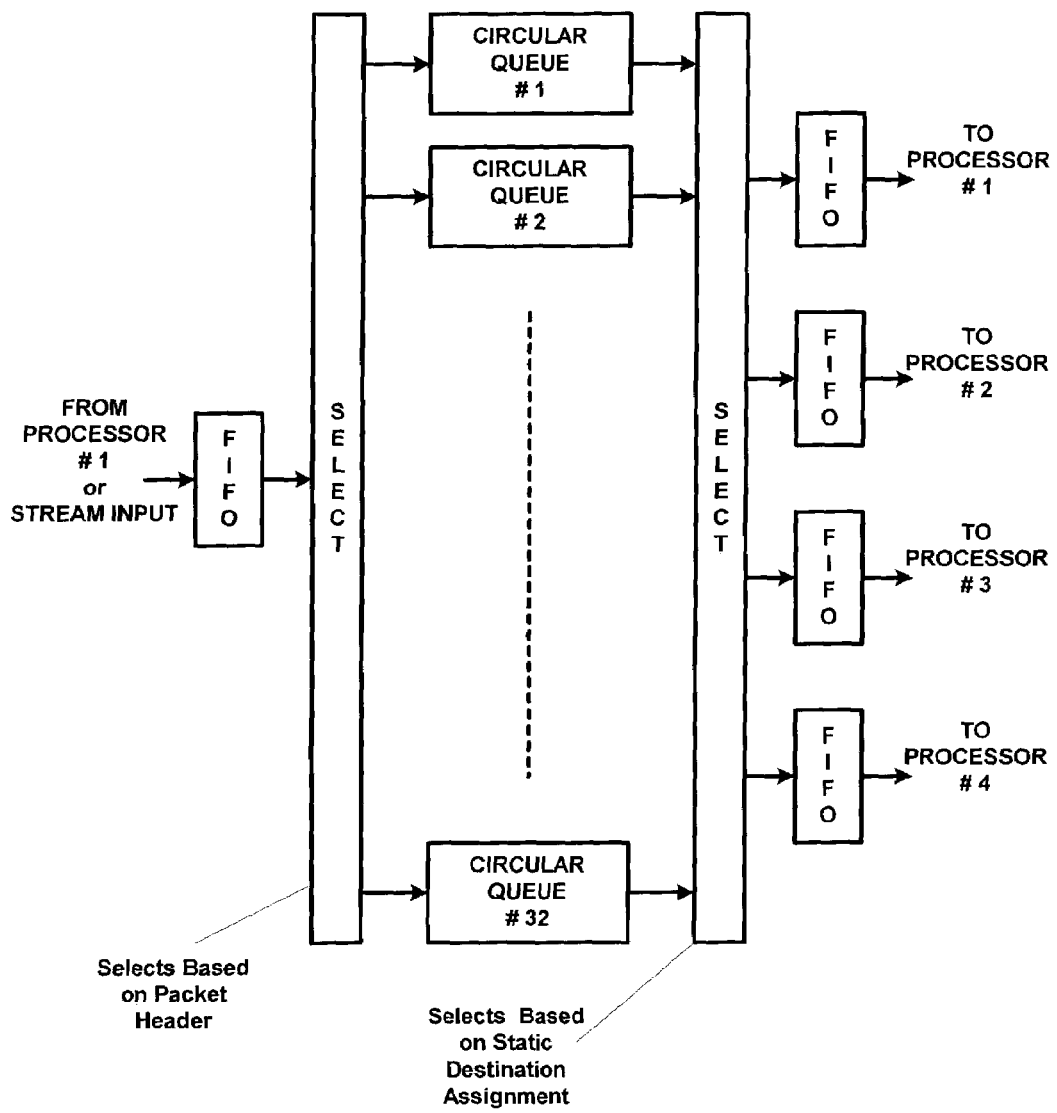
FIG. 13 illustrates the operation of packet based circular queues for interprocessor communication.

In a multi-processor system, data flow and communication between processors with minimal data sharing conflicts and bottleneck is very important for getting maximum utilization of these processors. The present invention solves this classical problem by using a unique and flexible method of interconnecting these processors and other data input and output ports using a combination of circular queues and descriptor based DMAs, whereby all the data is unified in an external SDRAM type memory. FIG. 13 illustrates the operation of packet based circular queues for interprocessor communication. In the preferred embodiment, there are 32 circular queues and 14 descriptor-based DMA channels that transfer data between input/output ports and four processors (video scalar and vector processor are counted as one processor in this context). Circular queue effectively implements a First-In-First-Out (FIFO) type buffer, using UM with a read and write pointer maintained by hardware for each channel. Circular queue type communication is used between the processors, and descriptor-based DMA transfers are used to transfer input/output video data and also video data between Unified Memory (UM) and video processor. All data, including input and output video data and compressed video stream input are routed via UM using DMA transfers. The advantage of this is increased buffer size without large FIFOs on the chip, and the ease of accessibility of data by multiple processors. Large amount of data-access throughput between the SDRAM memory controller and UM in external SDRAM (more than 2 Gigabytes per second using 64-bit wide DDR type interface, or larger) ensures that multiple DMA channels are serviced with reasonable latency without having any data overflow or underflow conditions.

At start-up time, one of the four processors, probably the system processor sets up all the static parameters defining which circular queues are assigned to which processors to be serviced. For example, we could define stream input to go to queue #1, which is to be serviced by the Stream Processor, which outputs data into five queues as follows:

Audio Processor Data Input Queue (let us say queue # 2);
Audio Processor Control Input Queue (let us say queue # 3);
System Processor Data Input Queue (let us say queue # 4);
System Processor Control Input Queue (let us say queue # 5);
Video Processor Data Input Queue A (let us say queue # 6)
Video Processor Data Input Queue B (let us say queue # 7)
Video Processor Control Input Queue (let us say queue # 8)

This example also illustrates how circular queue data could be interfaced to descriptor-based DMA data. Two circular queues are used in an interleaved manner, and both of these are set up never to request a DMA. When one frame of video data is placed into a circular queue A, stream processor starts using circular queue B for the next frame, and signals the video processor that the data is ready. Since the data is placed in consecutive locations and the start address of queue and its fullness is known, video processor could transfer this information to its local data memory from UM via DMA descriptors.

Data Flow Architecture

Figure 8:
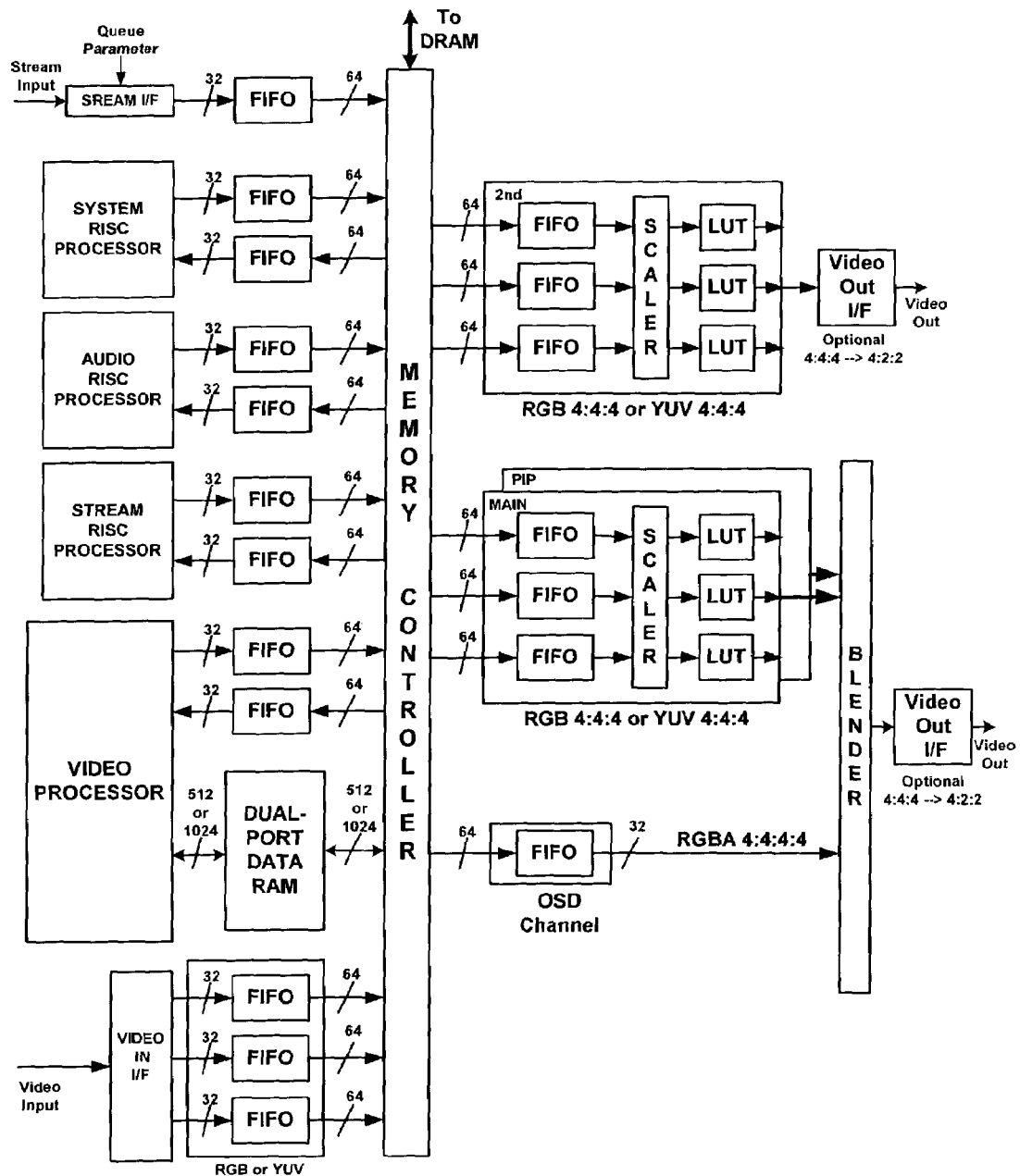
FIG. 8 illustrates the concept of data flow of the present invention.

The data flow block diagram of the present invention is shown in FIG. 8. The video input components are separated and DMA transferred separately. The formats supported are RGB and YUV with 4:4:4 and 4:2:2 component sampling. All processing internally done at separate component level, which significantly simplifies processing and data handling task. Furthermore, all data transfers are done using 16-bit resolution, even if the input has only 8-bits. This is to reduce the modality to handle different component and data resolutions. Second video input channel is optional (not shown). There are two video output channels, where both are processed as 4:4:4 component sampling, and optionally converted to 4:2:2 by a hardware block at the output. Video output # 1 is blended with the On-Screen Display (OSD) channel based on its Alpha channel. OSD is a 32-bit data, consisting of 8-bits for red, green, blue, and alpha channels. Alpha channel determines how the RGB components of OSD are mixed with the RGB components of video. Blender hardware multiplies video RGB channels with Alpha, which is assumed to be between zero and one, multiplies OSD RGB components with (1-Alpha), and resultant respective components are added together. The OSD channel is DMA transferred as one single channel, as there is no need for component independence and separate processing. It is presumed that OSD is created by the system processor and is blended with the video output generated by video processor.

One or more stream Input channels (one shown in the figure) are used to input compressed video stream. An input hardware interface block is used to change this stream into packets, and make it look like the inter-processor packets of data communication in order to unify the types of data flow.

Once packetized, the stream input is transferred to a selected circular queue, and from there it is transferred to Stream processor for demultiplexing into audio, video and system data streams. These multiple streams are transferred to audio, video, and system processors via separate circular queues.

Table 2 shows the list of physical DMA channels. Each of these DMA channels is capable of requesting a DMA transfer. A DMA request is made when the following condition is true:
Input FIFO reaches a certain pre-determined software programmable fullness level;
Output FIFO reaches a certain pre-determined software programmable emptiness level;
A circular queue reaches a certain pre-determined fullness level.

Each of the above physical channels has the following static control parameters programmed by software:
Channel Priority: Urgent, High, Medium, Low;
Enable;
DMA Burst Size.

These FIFOs have data-width conversion between 32 and 64 bits, because the processors have 32-bit data width, and UM has 64-bit wide access for high throughput.

Figure 9:
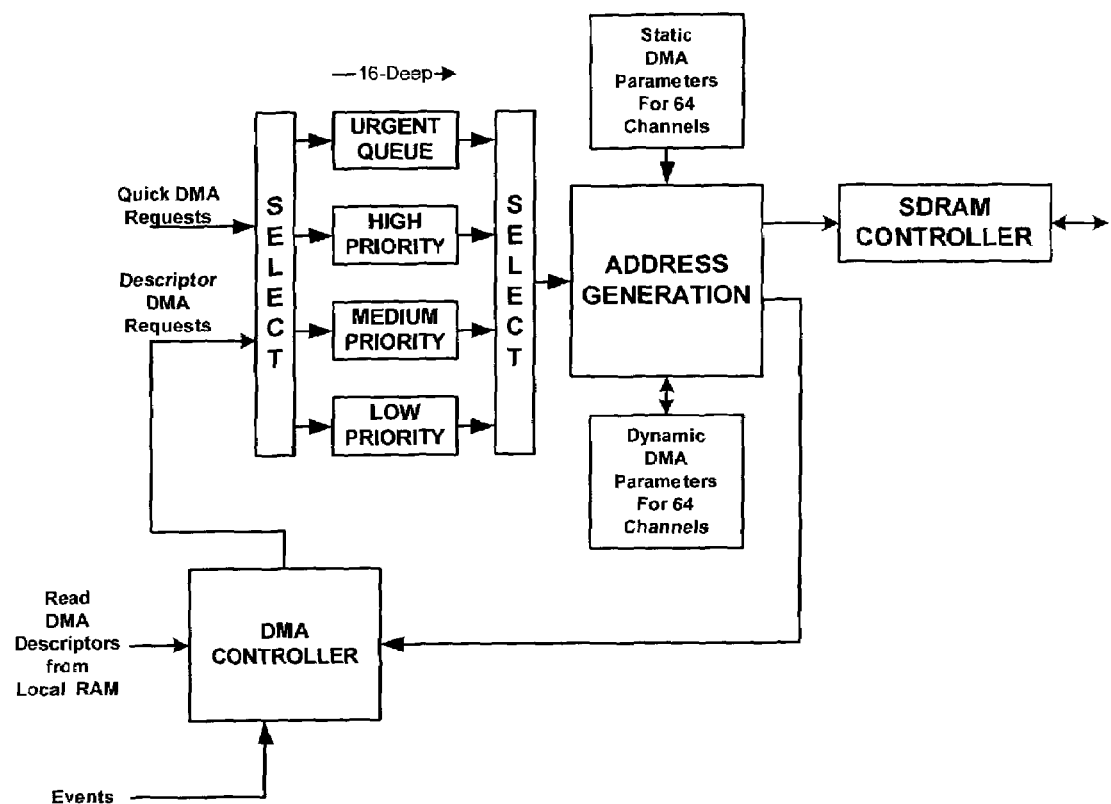
FIG. 9 shows the DMA request queues and the details of DMA control flow.

FIG. 9 shows the concept diagram of DMA channels. There are four queues into which all DMA transfer requests from circular queues and descriptor based DMA requests are placed. These four queues correspond to urgent, high, medium, and low priorities. Each queue in the preferred embodiment is 16 entries deep. Each entry indicates the type of request (circular queue or descriptor based), and pointer to relevant parameters, which could be physical FIFO number to be serviced for circular queues, or address of descriptor.

TABLE 2

| Physical DMA Channel | Number of Channels | Type |
| --- | --- | --- |
| Video Input # 1 RGB or YUV 4:4:4 or 4:2:2 | 3 | Descriptor-Based DMA |
| Video Input # 2 RGB or YUV 4:4:4 or 4:2:2 | 3 | Descriptor-Based DMA |
| Video Output # 1 RGB 4:4:4 | 3 | Descriptor-Based DMA |
| Video Output # 2 RGB 4:4:4 | 3 | Descriptor-Based DMA |
| On-Screen Display (OSD) RGBA 4:4:4:4 | 1 | Descriptor-Based DMA |
| Video Processor | 1 | Descriptor-Based DMA |
| Stream Input # 1 | 1 | Circular Queue |
| Stream Input # 2 | 1 | Circular Queue |
| Inter-Processor Data Transfer | 30 | Circular Queue |

Circular Queues

Figure 10:
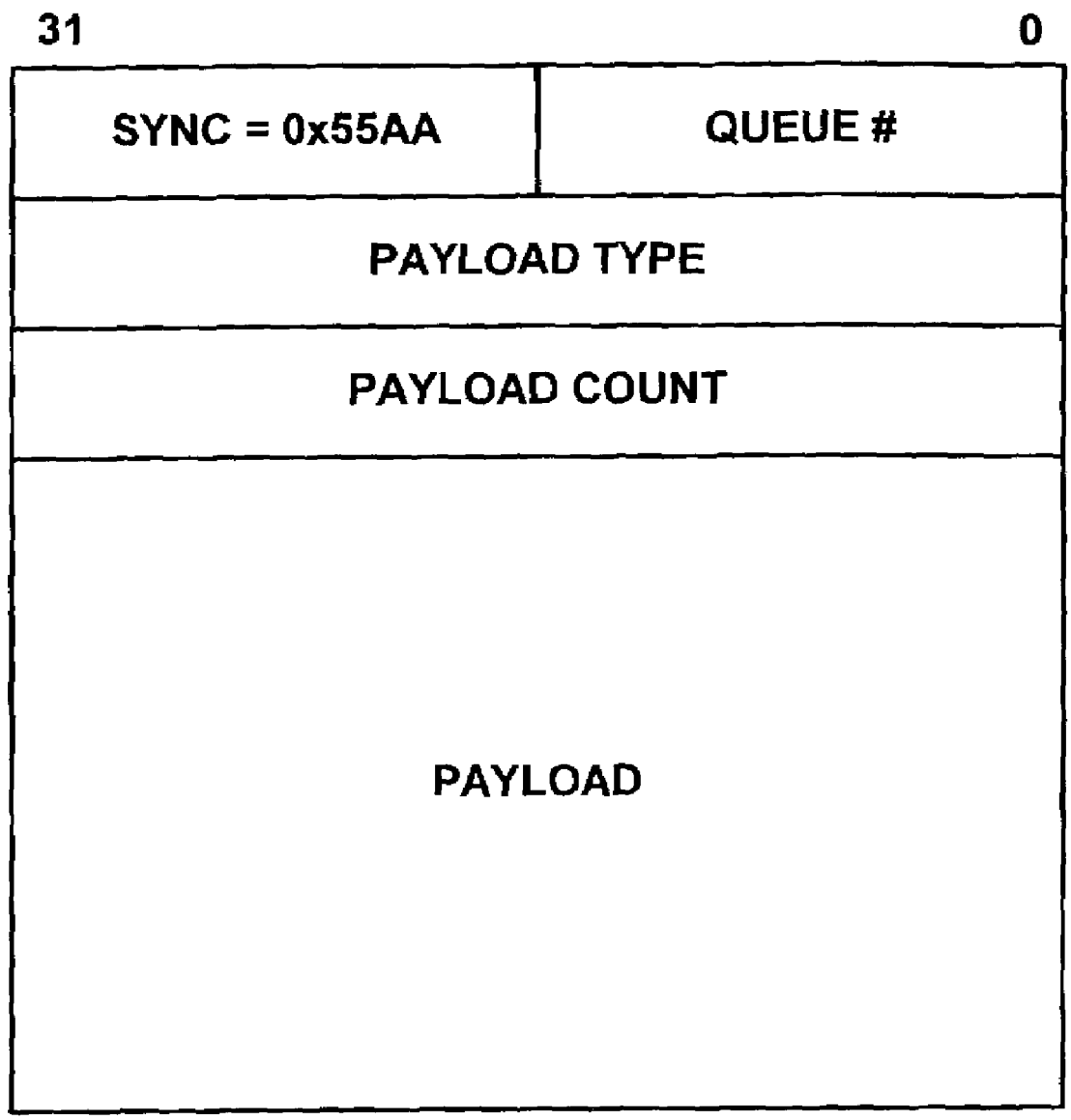
FIG. 10 shows the packets used for interprocessor data and control communication.

The circular queues' static parameters are controlled by software, and the dynamic parameters (read and write pointers) are controlled and maintained by hardware for each of the 32 circular queues. The circular queues of the present invention are packet based, whereby a given processor writes a packetized data into its outgoing FIFO. The packet header indicates which of the 32 queues to place data into, the type of packet, and the size of payload, as shown in FIG. 10. There is a static software based determination of each queue's destination. For example, let us say that Queue #9 is assigned to Audio processor. Stream processor demuxes an audio data packet and writes a packet into its outgoing FIFO using software store instructions. To send this packet to the Audio processor, it specifies Queue #9 in the packet header, and also indicates the packet type is audio. All data for a given processor is channeled through a single input and single output FIFO. When the outgoing FIFO reaches a certain level of fullness that is preprogrammed, a DMA is requested for that physical channel with the pre-selected priority. DMA hardware examines the packet header and determines which queue to place a given packet. This packet may be transferred in one piece or broken to smaller pieces, as determined by the software programmed burst-size for that source. For example when the Queue # 9 fullness reaches a predetermined level set by software, it requests a DMA transfer to the Audio processor's input FIFO, again where the burst size is programmable.

The following are the static parameters for each of the circular-queue type DMA channels:
a Start Address in external memory (read/write parameter)
Maximum size (read/write parameter)
Request Transfer Fullness (read/write parameter)
Reset: Empties queue (write-only parameter)
Destination Assignment (chooses one of the processors)
Buffer Fullness (Readable by all four processors)

These parameters allocate queue areas in UM, and define their operational parameters. There are 32 sets of the above static parameters for all circular queue channels. The packetized definition of circular-queue type data flow of the present invention is very flexible. For example, if the stream processor is running out of processing bandwidth, but if the audio processor has ample free cycles, stream processor may send a packet to the audio processor and tag it with a packet type indicating what type of processing it wants done on that packet. Audio processor could perform the requested function and then return the results using a different circular queue back to the stream processor. Diagnostic loopbacks could also be implemented by specifying a target queue number that is assigned to the sending processor, whereby the packet header indicates it is diagnostic information. A sync code is also embedded in the packet header, and the DMA controller checks it to make sure that the data is not out of sync (if so, a data sync error for a given channel group is signaled.)

Descriptor-Based DMA Channels

The descriptor-based DMA channels are used to transfer video between video input and output ports and video processor and UM. The descriptors are stored in data memory, and they are linked so that multiple descriptors could execute without any software interventions. These DMA channels could transfer data from any address in UM to local data memory without any address alignment restrictions. DMA hardware takes care of any alignment issues, using multiple access and clock cycles are necessary. Since DMAs occur in parallel with video processing and processing is usually the bottleneck, such additional cycles are hidden.

At the completion of a DMA descriptor, the DMA engine sets up a completion flag that is programmed for that channel. Also, it has the option to proceed with the next descriptor, if the link field is not zero, and the event bit selected is true. Events could be anything such as software set flags by one of the other processors, video frame timing signals, etc.

The interlaced video input could be placed in UM with even and odd frames interleaved, by having two descriptors, one for even field and one for odd field. One of the field addresses is one line higher than the other, and the line indexes for both is set to skip one line after each line. Alternatively, each field could be placed at separate locations in memory.

Figure 11:
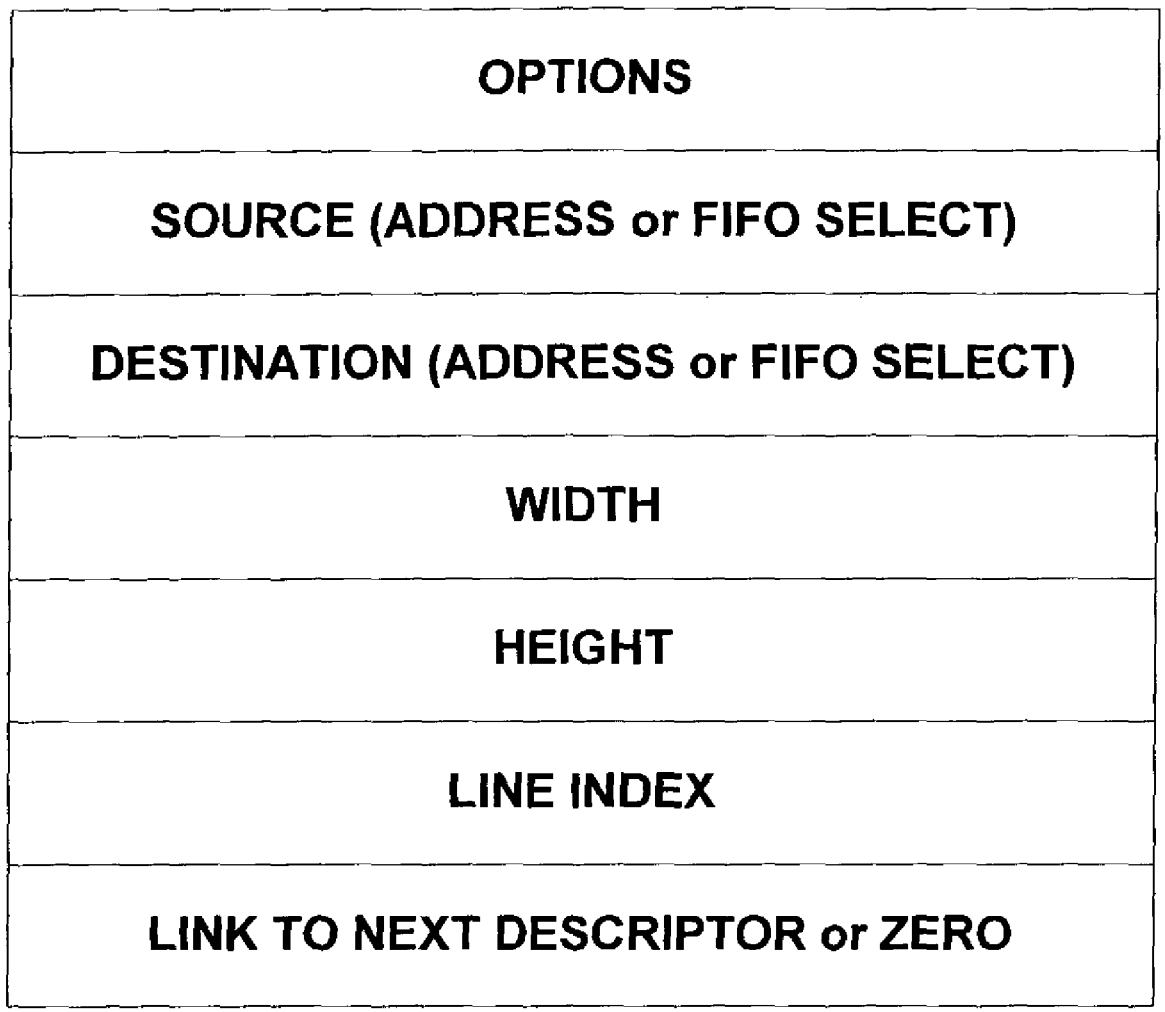
FIG. 11 shows the descriptor definition for descriptor-based DMAs.

The descriptor field is shown in FIG. 11, and the options are listed below.

Options Register Fields (Number of Control Bits Used):

| | |
|---|---|
| Source Type (1 bit): | Indicates the type of source field: FIFO select or memory address. |
| Destination Type (1 bit): | Indicates the type of destination field: FIFO select or memory address. |
| Priority (2 bits): | Urgent, high, medium, or low priority. |
| Sync Event # 1(6-bits) | Signals Start, zero for halt. |
| Sync Event # 2(6-bits) | Signals Start, zero for halt. |
| Completion Flag (5-bits) | Indicates a flag number to set to signal when this descriptor is completed. |
| Pixel Index (2-bits) | This field causes pixels to be sub-sampled only in the direction for reads from UM.<br>0: No subsampling;<br>1: Subsampling by ½ (every other pixel and line)<br>2: Subsampling by ¼ (every fourth pixel and line)<br>3: Subsampling by ⅛ (every eight pixel and line) |

Two sets of sync events are logically OR'd to generate a "go" flag for initiation or continuation with the next descriptor.

Figure 12:
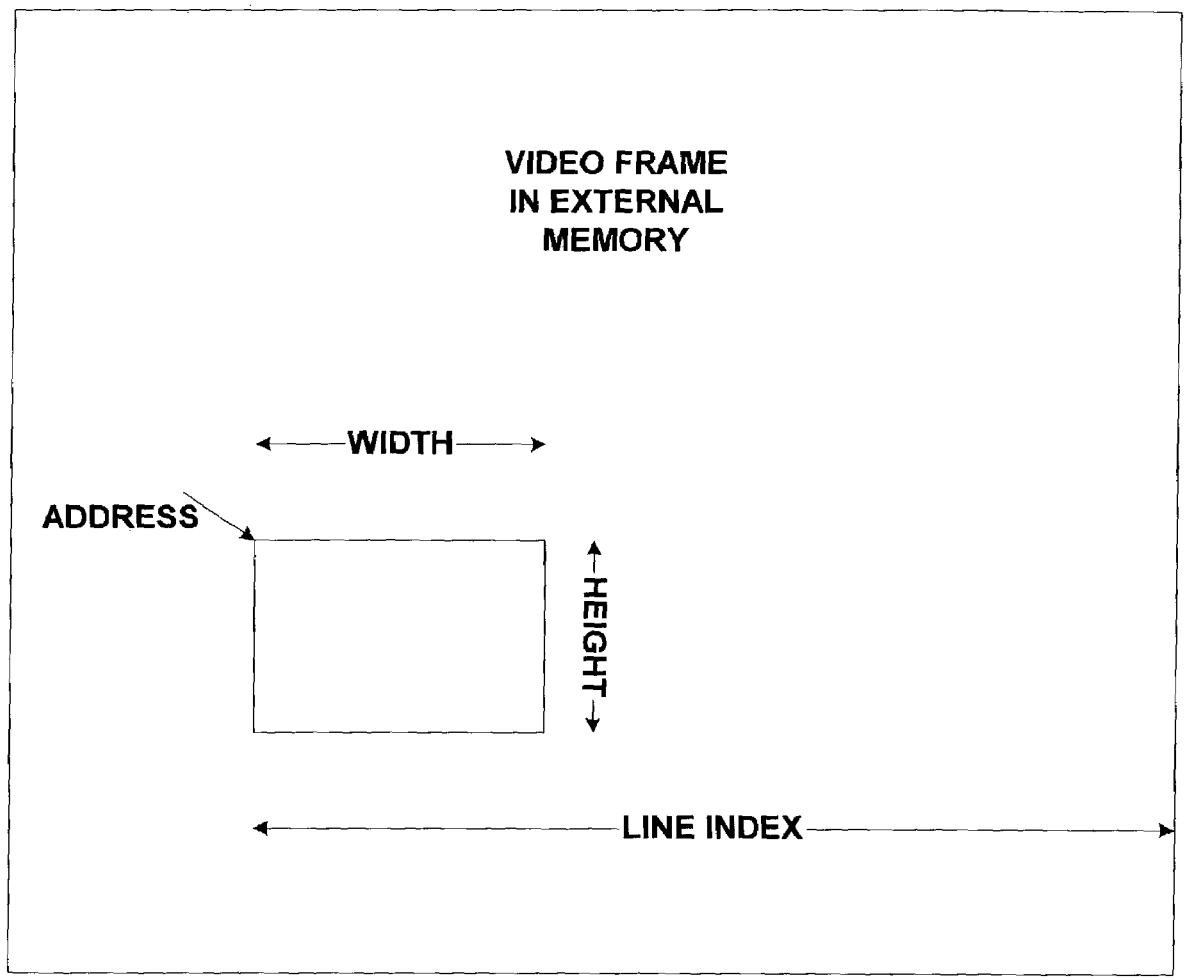
FIG. 12 shows the DMA transfer of a two-dimensional sub portion of a video frame between local data memory of video processor and external unified memory.

DMA could transfer any 2-D sub-area with a video frame using line index and width/height parameters, as illustrated in FIG. 12. The 2-D block area could be as small as 8×8 pixels, or could be as large as a video frame for a given descriptor. Also, DMA provides a subsampling of pixels on transfers from UM to local data memory of video processor, by every other pixel on every other line, every fourth pixel on every fourth line, and every eight pixel on every eight line. The width and height parameters refer to the resultant sub-sampled 2-D block in this case.

Event and Completion Flags

Events are used to synchronize descriptor-based DMA transfers. Events initiate DMA transfers for a given channel, and also allow them to continue with the next descriptor. Events could be set and cleared under software control (by the video processor), or by other events. There are four associated registers: Event-enable register, event-flag register, event-set register, and event-clear register. Possible list of events include the following:

Software Set Event Flags
Multiple Timer Interrupts;
External Interrupts;
Video Output #1 Frame End;
Video Output #1 Frame Begin;
Video Output #2 Frame End;
Video Output #2 Frame Begin;
Video Input #1 Frame End;
Video Input #1 Frame Begin
Video Input #2 Frame End;
Video Input #2 Frame Begin The completion flags are set by the DMA, as indicated by the completion flag field of a DMA descriptor, when that descriptor is done. The purpose of this is to signal the video processor (and perhaps other processors) about the status of DMA transfers.

Quick DMA Transfers

In addition to linked memory-based descriptors for the video DMAs, a second type of DMAs are provided whereby the video processor writes the DMA descriptor fields into quick DMA registers. This provides a quick way to generate DMAs that are dynamically generated by the software. For example, to perform block interpolation for MPEG-2 decode, the video processor could calculate the address of required 2-D small block in UM and write to Quick DMA registers. Quick DMA requests are also queued up like other DMAs. This way video processor could queue up one or more requests and then process existing data in memory. Completion flags will indicate when each DMA is done, as in other descriptor-based DMAs. Only the modified quick descriptor registers are written to minimize the software overhead of setting descriptor registers, where writing to the destination address register acts as "go" signal.

What is claimed is:

1. A single semiconductor chip for performing audio, video, and system functions comprising:
 a) a video processor comprising a RISC processor coupled to a single-instruction multiple data stream (SIMD) processor, which performs video compressing, video decompressing, video demodulating, and video enhancing: wherein the programmable video processor further comprises means for performing fixed and variable size Discrete Cosine Transform (DCT), Inverse Discrete Cosine Transform (IDCT), motion estimation, motion compensation, forward quantization, inverse quantization, run-length encoding, run-length decoding, temporal interpolation of 2-dimensional blocks, spatial interpolation of 2-dimensional blocks, and block edge filtering for video standards MPEG-1, MPEG-2, MPEG-4 part 2, MPEG-4 part 10, RealNetworks video standard RealVideo-8, Microsoft Video standard Windows Media Player 8.0, H.263, and H.264; and wherein the programmable video processor further comprises means for performing pre- and post-processing of video for enhancement purposes, using adaptive de-interlacing of video and adaptive motion compensation methods;
 b) an audio processor for performing audio processing;
 c) a digital bitstream processor which performs variable-length coding (VLC), variable-length decoding (VLD), multiplexing and demultiplexing of data streams, error correcting, decrypting, encrypting, and digital rights management processing;
 d) a system processor for handling system and network connectivity functions, which performs TCP/IP stack, on-screen displays, web browser, teletext, and user interface functions;
 e) a video scaler for scaling output video data with programmable parameters to match the resolution of a display unit;
 f) a memory controller coupled to an external memory array, where said memory array stores video data, audio data, system data, on-screen display data, and instruction data for each of the system processor, the video processor, the audio processor, and the bitstream processor;
 g) an audio input/output port coupled to the audio processor;
 h) a plurality of video input/output ports coupled to the video processor;
 i) a compressed audio/video input port coupled to the bitstream processor;
 j) a user interface port coupled to the system processor;
 k) a network interface port coupled to the system processor;
  whereby said single semiconductor chip incorporates a plurality of Digital TV functions;
  whereby said single semiconductor chip incorporates a plurality of Digital Camcorder functions; and whereby said single semiconductor chip incorporates a plurality of Camera functions; further comprising means for a plurality of DMA communications channels between the four processors (audio, video, system, and bitstream); further comprising means for sharing one unified external memory by all processors for data and instruction memory, for buffering of intermediate results, and for inter-processing data and message passing; further comprising means for buffering all input and output audio and video data in external unified memory; further comprising means for passing data and communicating between processors using unidirectional packet based communication via circular queues in external unified memory; the memory controller further comprising means for routing a plurality of communication packet means to a destination circular queue, said queue located in unified external memory; and said packet means comprising coded information including data, identification of destination processor, identification of destination processor, identification of queue that is associated with destination processor, packet type, and packet size.

2. The single semiconductor chip of claim 1, the video processor further comprising means for blending of multiple video object planes and on-screen display.

3. The single semiconductor chip of claim 1, further comprising hardware video output port and video processor for blending of multiple video and on-screen display.

4. The single semiconductor chip of claim 1, further comprising means for performing Look-Up Table (LUT) based non-linear scaling of video output components, utilizing the programmable video processor.

5. The single semiconductor chip of claim 1, further comprising hardware Look-Up Tables (LUT) coupled to the video output port and said hardware Look-Up Tables also coupled to the video processor.

6. The single semiconductor chip of claim 1, the programmable audio processor further comprising means for performing audio data compression and decompression.

7. The single semiconductor chip of claim 1, the programmable audio processor further comprising means for performing voice recognition.

8. The single semiconductor chip of claim 1, the programmable audio processor further comprising means for performing acoustical echo cancellation.

9. The single semiconductor chip of claim 6, the programmable bitstream processor further comprising means for performing Huffman coding and arithmetic coding and decoding of video streams.

10. The single semiconductor chip of clam 9, the programmable stream processor further comprising means for performing multiplexing and demultiplexing of audio, video, and user data according to each of the audio/video streaming standards: MPEG-1, MPEG-2, MPEG-4, ISMA 1.0, H.323.

11. The single semiconductor chip of claim 10, the programmable stream processor further comprising means for performing error correction, encryption and decryption.

12. The single semiconductor chip of claim 11 further comprising a hardware video scaler with programmable parameters coupled to the video processor, said hardware video scaler further comprising means for scaling video output data in two dimensions.

13. The single semiconductor chip of claim 12 further comprising a second hardware video scaler with programmable parameters coupled to the video processor, said second hardware scaler further comprising means for scaling a second video output to be displayed as a picture-in-picture.

14. The single semiconductor chip of claim 13, further comprising: means for buffering video and audio input and output data utilizing FIFO means to decouple external video and audio timing from internal processing and to compensate for variable software latencies.

15. The single semiconductor chip of claim 14, wherein the video inputs coupled to the video processor connect directly to a camera sensor chip, a NTSC/PAL decoder, and a Terrestrial/Satellite tuner demodulator chip.

16. The single semiconductor chip of claim 15, wherein the video outputs coupled to video processor connect directly to a video back-end PAL/NTSC encoder, and said video outputs connect directly to a display of type LCD.

17. The single semiconductor chip of claim 16, wherein the video outputs coupled to video processor connect directly to a video back-end PAL/NTSC encoder, and said video outputs connect directly to a display of type plasma.

18. The single semiconductor chip of claim 17, wherein an interface hardware coupled to the video processor connects directly to a physical layer HDMI chip.

19. The single semiconductor chip of claim 18, wherein an interface hardware coupled to the video processor connects directly to a physical layer USB chip.

20. The single semiconductor chip of claim 19, wherein the IDE interface coupled to the system processor connects directly to a hard disk, a CD-RW disk drive, and a DVD disk drive.

21. The single semiconductor chip of clam 20, where the IIC interface coupled to the system processor provides a direct control interface for external chips that implement the IIC interface and protocol.

22. The single semiconductor chip of claim 21, wherein the IIS interface coupled to audio processor provides direct connection to audio front-end chips for multi channel audio input and output, where those audio front-end chips implement the IIS interface and protocol.

23. The single semiconductor chip of claim 22, the memory controller further comprising means for selectively performing, during a DMA transfer from external memory: transferring a two-dimensional sub-block of an interlaced video field, and two-dimensional video sub-sampling.

24. The single semiconductor chip of claim 23, wherein the programmable video processor comprises a dual-issue processor including a standard RISC and a SIMD vector engine, whereby the RISC processor controls all data flow and data I/O including loading and storing of vector register elements.

25. The single semiconductor chip of claim 23, wherein the programmable video processor is a VLIW processor issuing two or more instructions per processor-clock cycle, and wherein one of the said issuing instructions is of SIMD type.

26. The single semiconductor chip of claim 23, the memory controller further comprising means for implementing a plurality of First-In-First-Out (FIFO) type circular queues in unified memory and maintaining buffer fullness information for each data channel that is readable by each of the four on-chip processors.

27. The signal semiconductor chip of claim 23, the bitstream processor further comprising a coprocessor for implementing encryption/decryption and DVD de-scrambler functions.

28. The single semiconductor chip of claim 27, the bitstream processor further comprising a hardware block for implementing encryption/decryption and DVD de-scrambler functions.

* * * * *